(12) United States Patent
Li (10) Patent No.: US 11,341,960 B2
(45) Date of Patent: May 24, 2022

(54) SMART CONTROL IMPLEMENTATION METHOD, DEVICE, AND COMPUTER READABLE STORAGE MEDIUM

(71) Applicant: XI'AN ZHONGXING NEW SOFTWARE CO. LTD., Shaanxi (CN)

(72) Inventor: Xiangyang Li, Guangdong (CN)

(73) Assignee: XI'AN ZHONGXING NEW SOFTWARE CO. LTD., Xi'an (CN)

(*) Notice: Subject to any disclaimer, the term of this patent is extended or adjusted under 35 U.S.C. 154(b) by 149 days.

(21) Appl. No.: 16/756,116

(22) PCT Filed: Nov. 27, 2018

(86) PCT No.: PCT/CN2018/117568
§ 371 (c)(1),
(2) Date: Apr. 14, 2020

(87) PCT Pub. No.: WO2019/101205
PCT Pub. Date: May 31, 2019

(65) Prior Publication Data
US 2020/0320986 A1    Oct. 8, 2020

(30) Foreign Application Priority Data

Nov. 27, 2017 (CN) .......................... 201711208095.6

(51) Int. Cl.
*G10L 15/22*   (2006.01)
*G10L 15/18*   (2013.01)
*G06F 40/20*   (2020.01)

(52) U.S. Cl.
CPC .......... *G10L 15/1822* (2013.01); *G06F 40/20* (2020.01); *G10L 15/1815* (2013.01); *G10L 15/22* (2013.01)

(58) Field of Classification Search
CPC .......... G10L 15/22–2015/228; G10L 15/1822; G10L 15/1815; G06F 40/20
See application file for complete search history.

(56) References Cited

U.S. PATENT DOCUMENTS

| 2011/0055188 A1* | 3/2011 | Gras | G06F 16/951 707/706 |
| 2013/0018867 A1* | 1/2013 | Regan | G06F 16/951 707/707 |
| 2018/0122370 A1* | 5/2018 | Wyss | G10L 15/193 |

* cited by examiner

*Primary Examiner* — Abul K Azad (57) ABSTRACT

Disclosed are a smart control implementation method, a smart control implementation device, and a computer readable storage medium. The smart control implementation method includes: configuring pre-determined syntax information which is including sentence pattern rules, an instruction set, and semantic tags corresponding to the sentence pattern rules, wherein the semantic tags indicating semantics of a corresponding sentence pattern rule thereof (201); acquiring control information (202); identifying the control information on the basis of the pre-determined syntax information, and acquiring semantic tags corresponding to a matched sentence pattern rule of the control information (203); determining a control intention according to the semantic tags corresponding to the matched sentence pattern rule of the control information (204); and executing a control action according to the control intention (205).

13 Claims, 4 Drawing Sheets

SMART CONTROL IMPLEMENTATION METHOD, DEVICE, AND COMPUTER READABLE STORAGE MEDIUM

CROSS-REFERENCE TO RELATED APPLICATIONS

This application claims the priority of Chinese patent application CN 201711208095.6 filed with the China Patent Office on Nov. 27, 2017, the entirety of which is incorporated herein by reference.

FIELD OF THE INVENTION

The present disclosure relates to the communication technology, and in particular, to a smart control implementation method, a smart control implementation device, and a computer readable storage medium.

BACKGROUND OF THE INVENTION

With the rapid development of mobile communication technologies, a mobile terminal has become a necessity in people's daily life, and hardware configuration of an intelligent mobile terminal is higher and higher. At present, the intelligent mobile terminal has extremely complex functions, and services thereof are rapidly increased. On the one hand, various requirements of users are met, and the users can obtain massive information from small mobile terminals, meeting various needs of different user groups; but on the other hand, as more functions are embedded in the mobile terminal and as the function of each module becomes more powerful, control thereof becomes more complex, and the control process becomes more complicated, which brings great trouble and inconvenience to the users. The intelligent voice technology exhibits great advantages in avoiding such circumstances and can greatly improve the experience of man-machine interaction, so that various types of voice products are increasingly available nowadays.

At present, various intelligent voice products integrate more and more functions, but voice control, namely the actual action of control responded by a voice product after recognizing a voice instruction spoken by a user, is the most important, most useful and most commonly used function among various functions, and in a broad sense, all voice functions can be attributed to voice control.

Among various technical solutions for implementing the interaction process of voice smart control, an embedded voice recognition solution becomes a most widely used implementation solution in most voice products due to the characteristics of no dependence on a network connection environment, fast response, accurate recognition and so on. Generally, in the technical solution of embedded voice recognition, a syntax file based on Backus-Naur Form (BNF) is relied on. Sentence pattern rules and command sets under various usage scenes are defined through the file, and an exact recognition result is given within the scope of the syntax file when voice recognition is carried out. Voice recognition relying on the above syntax file includes voice recognition of different language types, such as recognition of Chinese, English and Spanish and so on.

Figure 1:
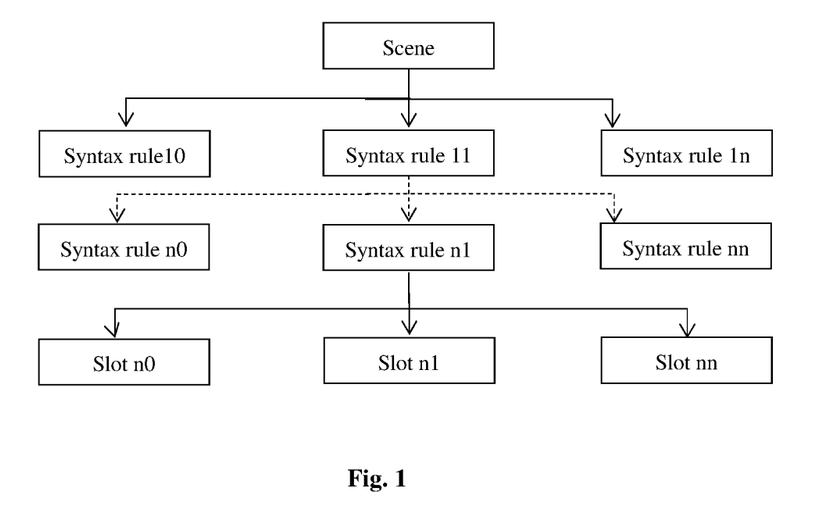
FIG. 1 is a schematic diagram of a syntax document in related technologies.

At present, the above BNF-based syntax definition technology is used in the embedded voice recognition of most voice recognition manufacturers in the market, and the specific implementation solutions are different and basically have definition layers of syntax rules and slots. As shown in FIG. 1, a scene includes a syntax rule 10 to a syntax rule 1n; the syntax rule 11 includes a syntax rule n0 to a syntax rule nn; and the syntax rule n1 includes a groove n0 to a groove nn. It should be noted that FIG. 1 is only an example. The syntax definition has various limitations, even including a circumstance of limitation that the length of the slot cannot exceed 14 characters, and a relatively better definition only means that the content directly follows the name in the definition of each rule and the definition of the slot. In this way, when the system returns a result, only the content conforming to the sentence pattern of a certain rule can be returned. To be exact, only the corresponding text of multiple slots meeting a certain rule will be returned. Accordingly, when performing further control according to the text, an upper layer can only determine the content spoken by the user based on a strict comparison of the text so as to perform a corresponding operation. The extendibility of this implementation manner is not good.

SUMMARY OF THE INVENTION

A summary of the subject matter described in detail herein is provided below. This summary is not for the purpose of limiting the protection scope of the claims.

Embodiments of the present application provide a smart control implementation method, a smart control implementation device, and a computer readable storage medium, which can improve extendibility of smart control.

An embodiment of the present application provides a smart control implementation method. The method includes: configuring pre-determined syntax information which is including sentence pattern rules, an instruction set, and semantic tags corresponding to the sentence pattern rules, wherein the semantic tags indicating semantics of an instruction meeting a corresponding sentence pattern rule thereof; acquiring control information; identifying the control information on the basis of the pre-determined syntax information, and acquiring semantic tags corresponding to a matched sentence pattern rule of the control information; and determining a control intention according to the semantic tags corresponding to the matched sentence pattern rule of the control information. An embodiment of the present application provides a smart control implementation device, which includes a configuration module, a control information acquisition module, a control information identification module, and a semantics extraction module. The configuration module is configured to configure pre-determined syntax information which is including sentence pattern rules, an instruction set, and semantic tags corresponding to the sentence pattern rules, the semantic tags indicating semantics of an instruction meeting a corresponding sentence pattern rule thereof; the control information acquisition module is configured to acquire control information and send the control information to the control information identification module; the control information identification module is configured to identify the control information on the basis of the pre-determined syntax information configured by the configuration module, acquire semantic tags corresponding to a matched sentence pattern rule of the control information, and send the semantic tags to the semantics extraction module; and the semantics extraction module is configured to determine a control intention according to the semantic tags corresponding to the matched sentence pattern rule of the control information.

An embodiment of the present application provides a smart control implementation device, including a memory and a processor. The memory stores a program which, when read and executed by the processor, implements the smart control implementation method according to any of the foregoing embodiments.

An embodiment of the present application provides a computer readable storage medium. The computer readable storage medium stores at least one program that is executable by at least one processor so as to implement the smart control implementation method according to any of the foregoing embodiments.

After the accompanying drawings and the detailed description are read and understood, other aspects will become apparent.

BRIEF DESCRIPTION OF THE DRAWINGS

The accompanying drawings are used for providing further understanding of the technical solution of the present application, constitute one part of the description, are used for explaining the technical solution of the present application together with embodiments of the present application, and are not intended for limiting to the technical solution of the present application.

DETAILED DESCRIPTION OF THE EMBODIMENTS

Embodiments of the present application will be described in detail below with reference to the accompanying drawings. It should be noted that embodiments of the present application and features in the embodiments may be combined with each other randomly if there is no conflict.

Steps shown in the flowcharts of the drawings may be performed, for example, in a computer system with a group of computer executable instructions. Moreover, although a logical order is shown in the flowcharts, the steps illustrated or described may be performed in an order different from the order herein in some cases.

In related technologies, content spoken by a user can only be determined based on a strict comparison of text, and further a corresponding operation is performed. This manner includes the following circumstances. A first circumstance is that in a tree structure of syntax rules, when instructions of the same category corresponding to a leaf node of an end (i.e., a terminal) are changed (added, deleted, and modified), a process of matching according to the text needs to be changed correspondingly. A second circumstance is that when a corresponding sub-rule under a rule is changed (for example, syntax structures of different languages are different), a structure of a result returned will be greatly changed; and when a control is performed based on a result of voice recognition extracted, an original logic is no longer applicable, and overall modification and adaptation need to be made, which greatly affects the extendibility thereof.

In the present application, an instruction and extraction of a control intention are separated, and semantic tags are added to the syntax document. Herein, the semantic tags correspond to a sentence pattern rule and indicate semantics of an instruction meeting a corresponding sentence pattern rule; and when control information is identified, the semantic tags are obtained, and identification of the control intention is performed according to the semantic tags. With this identification manner, when the instruction is changed (for example, same semantics is expressed by different instructions in different languages), if the semantics corresponding to the instruction is not changed, semantic tags obtained during identification are not changed. Correspondingly, there is no need to change the process of performing a control according to the semantic tags, and it is convenient to make extension. In addition, when a sub-rule under a rule is changed (for example, difference in the syntax structure of different languages results in change in the word order of sentences for the same semantics, so that the sub-rule is changed), a returned text instruction may be changed. However, in the present application, semantic tags are returned, and returned information is not changed as long as the semantics are the same. Therefore, by performing identification of the control intention according to the semantic tags, no modification needs to be made for further performing the control, and as long as a modification to the syntax document needs to be made, which greatly improves the extendibility.

Embodiment 1

Figure 2:
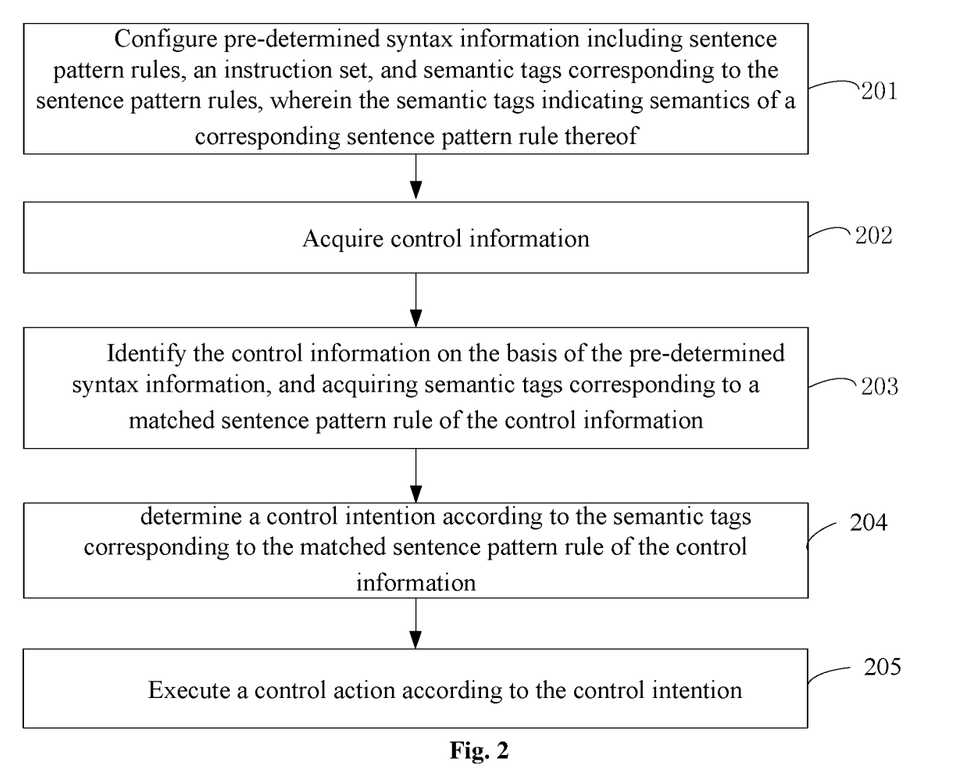
FIG. 2 is a flowchart of a smart control implementation method provided in an embodiment of the present application.

FIG. 2 is a flowchart of a smart control implementation method provided in an embodiment of the present application. As shown in FIG. 2, step 201 to step 205 are included.

At step 201, pre-determined syntax information is configured. The pre-determined syntax information includes sentence pattern rules, an instruction set, and semantic tags corresponding to the sentence pattern rules, and the semantic tags indicate semantics of an instruction meeting a corresponding sentence pattern rule thereof.

At step 202, control information is acquired.

At step 203, the control information is identified on the basis of the pre-determined syntax information, and semantic tags corresponding to a matched sentence pattern rule of the control information are acquired.

At step 204, a control intention is determined according to the semantic tags corresponding to the matched sentence pattern rule of the control information.

In the present embodiment, semantic information is separated from a specific sentence pattern of an instruction and text content of the instruction in order to make the semantic information get rid of its dependence on specific instruction sentence and instruction text contentsemantic, so that change in sub-rules under a sentence pattern rule for supporting identification of a new voice instruction, and "addition", "deletion" and "modification" of the instruction set of text do not affect extraction of the semantics and subsequent controls. In this way, universality of semantic extraction to a voice recognition result is increased, so that extendibility and configurability of the embedded voice recognition are increased.

In an embodiment, step 205 is further included. At step 205, a control action is executed according to the control intention.

In an embodiment, at step 202, the control information includes at least one of the following: voice information and text information. Taking voice control as an example, acquiring control information refers to acquiring voice information. It is certain that smart control may also be performed through text. At this time, the control information is text information. It is certain that a control may be performed by combining the voice information and the text information.

In an embodiment, the pre-determined syntax information at step 201 may be a BNF syntax document. The pre-determined syntax information includes at least one instruction set, and each instruction set includes at least one instruction. In an embodiment, taking the pre-determined syntax information being a BNF syntax document as an example, the pre-determined syntax information has a tree structure, and the pre-determined syntax information includes a main rule, a sub-rule and a slot. The main rule includes at least one sub-rule, a sub-rule including at least one sub-rule or includes at least one slot, each slot including one instruction set. At least one of the main rule, the sub-rule and the slot has a corresponding semantic tag. For example, only the slot has a corresponding semantic tag. It is certain that the main rule, the sub-rule and the slot all have a corresponding semantic tag respectively.

In an embodiment, when a control is performed based on the voice information, at step 201, in addition to configuring the pre-determined syntax information, linguistic data resources, namely relevant voice resources of the language used in the control, should also be configured. Linguistic data resources of at least one language may be configured, so as to support a voice control of multiple languages.

In an embodiment, instructions may be classified, and instructions with the same semantics are classified into one category. One piece of identification information is allocated for the instructions of the same category uniformly, and the identification information is used to indicate the category of the instructions. For example, in the scene of calling, instructions of "family number", "home", and "home number" represent one meaning, and they may be classified into one category. In this way, during determination of the control intention in a later period, there is no need to perform matching and comparison to the instructions of "family number", "home", and "home number" separately, and the meaning thereof may be known based on the identification information thereof only. At step 203, when the control information is identified on basis of the pre-determined syntax information, the matched identification information of the instruction is also acquired. During determination of the control intention, the control intention is determined according to the semantic tags and the identification information. It should be noted that in other embodiments, instruction information may not be classified, and determining a meaning thereof may be performed only by making a comparison between matched instruction information and pre-stored information. Besides, the comparison in the present embodiment is not a comparison for the whole text instruction, but a comparison for part of the identified text instruction. For example, the control information being "calling the home number of Zhang San" is taken as an example. In related technologies, it is needed to make matching and comparison for the entirety of "calling the home number of Zhang San" so as to determine the control intention thereof. However, in the present application, it has been identified, on basis of the semantic tags, that the intention is calling a number of Zhang San, and only a comparison for the family number is needed so as to determine the specific number to be called without the need of making a comparison for the entirety of the text instruction. If the instructions have been classified, the comparison is not needed here. The identification information, for example, 1, is extracted directly, and it is known, according to pre-definition, that 1 represents the home number. At this time, it is determined directly that the control intention is calling the home number of Zhang San, thereby further reducing complexity of semantics recognition. Moreover, the extendibility thereof is better. This is because during determination of the control intention, the determination is made on basis of the identification information only and does not rely on the specific text instruction. In a circumstance that the text instruction is changed while the semantics remains the same, since the identification information remains the same, it is not needed to change an identification process of the control intention, and only the syntax document needs to be modified.

In an embodiment, acquiring semantic tags corresponding to a matched sentence pattern rule of the control information includes: acquiring semantic tags corresponding to a matched sentence pattern rule of the control information, and acquiring a matched instruction of the control information, wherein the matched instruction having a correspondence relationship with the semantic tags corresponding to the matched sentence pattern rule.

Determining a control intention according to the semantic tags corresponding to the matched sentence pattern rule of the control information includes: determining a control intention according to the semantic tags corresponding to the matched sentence pattern rule of the control information and according to the matched instruction of the control information.

In an embodiment, instructions in the instruction set are classified, and instructions with same semantics are classified into one category. One piece of identification information is allocated for instructions of the same category uniformly, and the identification information is used to indicate the category of the instructions. Acquiring semantic tags corresponding to a matched sentence pattern rule of the control information includes: acquiring semantic tags corresponding to a matched sentence pattern rule of the control information and acquiring a matched instruction of the control information, or acquiring semantic tags corresponding to a matched sentence pattern rule of the control information and acquiring a matched instruction of the control information and acquiring identification information of the matched instruction of the control information.

Determining a control intention according to the semantic tags corresponding to the matched sentence pattern rule of the control information includes: determining a control intention according to the semantic tags corresponding to the matched sentence pattern rule of the control information and the identification information of the matched instruction; or determining a control intention according to the semantic tags corresponding to the matched sentence pattern rule of the control information, the matched instruction, and the identification information of the matched instruction.

In addition, when the control information is identified on the basis of the pre-determined syntax information, a matched instruction is also acquired, wherein the instruction having a correspondence relationship with a semantic tag. Taking the BNF syntax document as an example, a semantic tag corresponding to a slot has a correspondence relationship with an instruction included in this slot. For example, taking calling as an example, the following semantic tags exist: a semantic tag indicating that a current action is calling; and a semantic tag indicating a specific name. The semantic tag indicating a specific name is a semantic tag corresponding to one slot. This slot includes instructions such as "Zhang San" (" 张三 "), "Li Si" (" 李四 "), "Wang Wu" (" 王五 "), and this semantic tag indicating a specific name has a correspondence relationship with an instruction "Zhang San", "Li Si" or "Wang Wu". At step 204, during determination of a control intention, the control intention is determined according to the semantic tags and a matched instruction. For example, matched semantic tags include a calling semantic tag indicating that the current action is calling and a semantic tag indicating a specific name; and matched instructions include "phoning" and "Zhang San". At this time, during determination of the control intention, it is determined that a current control intention is calling someone according to the semantic tags, and further it is known that the current intention is calling Zhang San based on that the instruction corresponding to the semantic tag indicating a name is Zhang San.

In an embodiment, at step 203, when the control information is identified based on the pre-determined syntax information, a matched instruction and identification information of an instruction are further acquired. At 204, during determination of a control intention, the control intention is determined based on the matched semantic tags, the instruction, and the identification information of the instruction. It should be noted that the matched instruction and the instruction in the identification information of the instruction may be different instructions. For example, an acquired instruction is "Zhang San", while acquired identification information of the instruction is identification information of another instruction such as the home number.

Embodiment 2

In the embedded voice recognition system, as to function, dialing by using voice is a basic function supported by voice assistant applications in a handheld terminal, and is also one of functions that are mostly used by the users and can bring great convenience to the users. In the present embodiment, a function of dialing a number of someone by using voice is taken as example to explain the present application.

Figure 3:
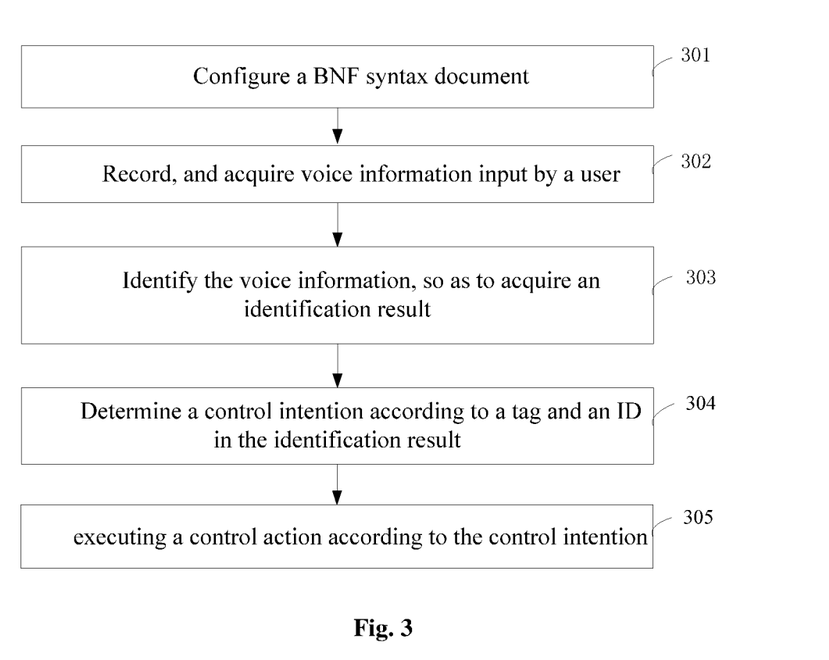
FIG. 3 is a flowchart of a smart control implementation method provided in another embodiment of the present application.

The present embodiment provides a smart control implementation method, as shown in FIG. 3. The method includes step 301 to step 305.

At step 301, a BNF syntax document is configured.

At first, voice sayings, i.e., language features, supported by a function are designed according to the functional needs of a voice product. A set of sentence patterns for the function is designed through rules of a series of layers, and text instructions supported are designed through slots at terminals. These text instructions are combined according to rules, so as to form various sentence patterns of a language.

Then, semantics is extracted, and information such as tag and id are added to the rules and text instruction sets of the slots. For example, the following information is added to the BNF syntax document.

(1) Semantic tags are added for sentence patterns of a rule layer in a tree structure of the BNF syntax.

A specific format of addition is that, after the rule at this layer is defined (a definition of the rule includes a set of English characters enclosed with symbols < > and an English semicolon ";" which follows closely), an English identification "!tag" is used at the beginning, and "( )" follows. In "( )", there are two parts, separation of which are indicated by a comma. The former part includes content of the tag described in English, and the latter part includes expressions of a set of sentence patterns corresponding to the rule.

Semantics identification of this category may be obtained by extracting content information corresponding to the tag. The main purpose of this part is to obtain semantics of the layer by extracting tag information of sentence patterns at different layers as required.

(2) At respective leaf nodes (i.e., slot) of the tree structure of the BNF syntax, sets of text instructions at terminals are classified. Instructions with the same semantics are classified into one category, and a same id is added for text instructions of the same category for clustering.

One implementation manner is that an identity like "!id (n)" is added after respective text instructions. "n" in the parentheses is a natural number arranged in order, and represents a serial number of the set to which the instruction belongs. It should be noted that, the id may not be a natural number or may not be a number, but may be other information such as a pre-defined sign.

When the control information is identified, the category of the semantics can be acquired only by extracting the serial number of the set. The main purpose is to achieve that extraction of the semantics is decoupled from a specific size of an instruction set and specific content of instruction text, so that changes of the text instruction set may be realized through configuration.

It should be noted that the above manners of adding the tag and the identity (ID) are only examples, and other manners of addition for the same purpose are also within the protection scope of the present application.

An example of the BNF syntax document is provided below. In the embedded voice recognition system, since there is no content information when a user initiates a phoning, a scene is defined as a main scene, which is described as <main_scene> by using the BNF syntax. In this scene, rules and slots at respective layers are designed correspondingly below. One implementation manner is as follows.

```
<main_scene>: <Call> | <PlayMusic>;
<Call>:
    !tag(CALL_TAG,
<CallOnly>|<CallName>|<CallYellowPage>|
<CallNumber>|<CallGarbage>
    );
<CallName>:
    !tag(CALLNAME_TAG,
        <CallCmd> <NameAndPhoneType>
    );
<CallCmd>:
    !tag(CALLCMD_TAG,
        "呼叫"
        "打电话给"
        "打给"
        "打个电话给"
        "我想呼叫"
    );
<NameAndPhoneType>:
    ( <name> [<LocationFiller>] <PhoneType> );
<name>:
    !tag(NAME_TAG,
        "张三"
        "李四"
        "王五"
        "赵麻子"
    );
```

-continued

```
<LocationFiller>:
    "的";
<PhoneType>:
    !tag(PHONETYPE_TAG,
        "家庭号码"    !id(1) |
        "住宅"       !id(1) |
        "住宅号码"    !id(1) |
        "座机"       !id(1) |
        "工作号码"    !id(2) |
        "单位号码"    !id(2) |
        "手机号码"    !id(3) |
        "手机"       !id(3) |
        "其他"       !id(4) |
        "其他号码"    !id(4)
    );
```

Figure 4:
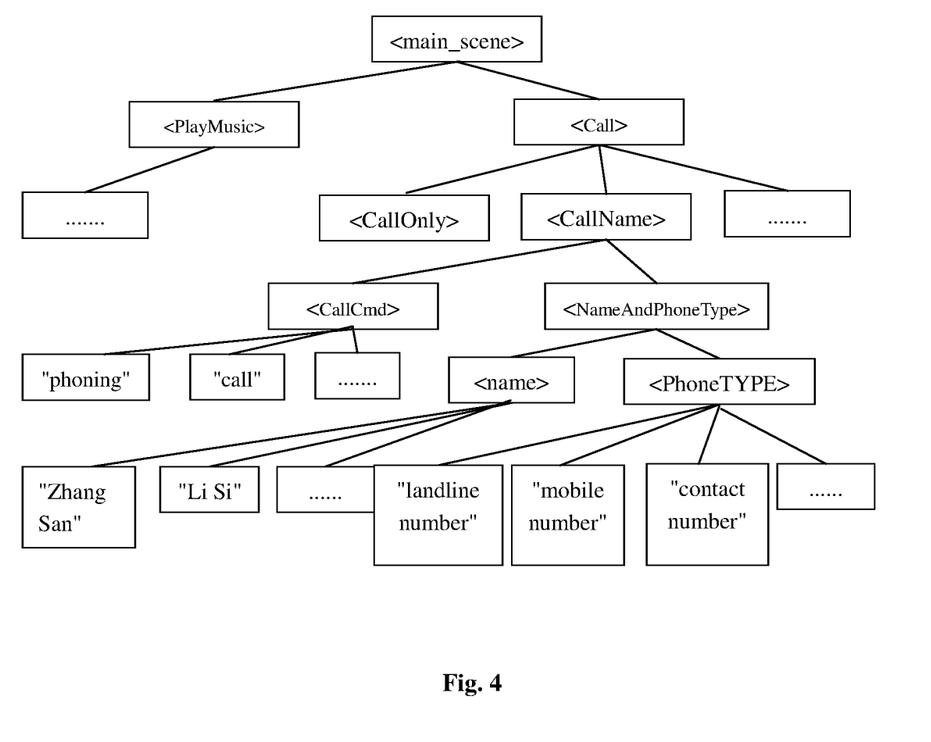
FIG. 4 is a schematic diagram of a BNF syntax rule provided in an embodiment of the present application.

As can be seen, each rule may have sub-rules, and a sub-rule has sub-rules of its own, a tree structure including layers being formed. The tree structure is shown in FIG. 4, and includes main rules, sub-rules, and slots. The rule <Call> is a main rule, which includes sub-rules such as <CallOnly>, <CallName>, <CallYellowPage> (not shown in FIG. 4), <CallNumber> (not shown in FIG. 4), and <CallGarbage> (not shown in FIG. 4). A sub-rule further includes sub-rules of its own or includes slots. For example, the sub-rule <CallName> includes sub-rules such as <CallCmd> and <NameAndPhoneType>. The layers go on until a leaf node slot at a terminal is reached, for example, <CallCmd>. The content of <CallCmd> is at least one set of instructions, and the instructions include "呼叫" ("phoning"), "打电话给" ("calling") and so on.

In the present embodiment, information added mainly includes two aspects. On a first aspect, one tag with a corresponding value is added for a rule at each layer. For example, the value of the tag added to the rule <CallName> is "CALLNAME_TAG". On a second aspect, in some cases, identification information id may be further added to a slot of a leaf node at a terminal. For example, for a slot <PhoneType> in the above example, besides adding a tag PHONETYPE_TAG, content thereof is classified. Instructions of the same semantics are identified with the same id. For example, it is defined that an id of different expressions for the phone type of home number is 1. It should be noted that, in other embodiments, the identification information may not be added. It should be noted that, in other embodiments, tags may be added to part of rules and slots only as long as an intention of control information identified can be indicated accurately.

After the BNF is edited and added with related information, compilation is performed to the BNF, so that the BNF is compiled from a text document into a type of a machine-readable binary file. If the compilation succeeds, it is indicated that the syntax edition is accurate, and the machine-readable binary file may be generated; and if compilation fails, it is needed to re-edit the syntax. It is possible that the edition of the syntax does not conform to the grammatical rules, and therefore the syntax needs to be adjusted and re-compiled until the compilation succeeds.

The compiled binary file is loaded. After the compiled binary file is loaded into cache, a prepared state is achieved, and the compiled binary file may be used in a voice recognition process.

At step 302, recording is performed so as to acquire voice information input by the user.

In the present embodiment, it is supposed that the voice information input by the user is "打电话给赵麻子的家庭号码" ("calling the home number of Zhao Mazi").

At step 303, the voice information is identified so as to acquire an identification result.

In the present embodiment, when the identification result is returned after the voice information is identified, not only a corresponding text instruction identified is returned (in the form of a field), but also a tag and an ID are returned; and the tag and the ID have a correspondence relationship with the field returned.

In the present embodiment, "打电话给" ("calling"), "赵麻子" ("Zhao Mazi"), "的" ("of"), and "家庭号码" ("the home number") are returned with different fields, and the tag and the id are returned. Tags returned are: CALL_TAG, CALLNAME_TAG, CALLCMD_TAG, NAME_TAG, and PHONETYPE_TAG. An id returned is the id corresponding to "家庭号码" ("the home number"), i.e., id:1. A tag has a correspondence relationship with a returned field. For example, the tag has a correspondence relationship with an instruction included in a corresponding slot. For instance, CALLCMD_TAG has a relationship with "打电话给" ("calling"); NAME_TAG has a relationship with "赵麻子" ("Zhao Mazi"); and PHONETYPE_TAG has a relationship with "家庭号码" ("the home number").

An example of the returned result is provided below. Taking calling the home number of Zhao Mazi as an example, one format of the returned result is as follows.

```
{
    "startRule": "main_scene",
    "items": [
        {
            "type": "tag",
            "name": "CALL_TAG",
            "items": [
                {
                    "type": "tag",
                    "name": "CALLNAME_TAG",
                    "items": [
                        {
                            "type": "tag",
                            "name": "CALLCMD_TAG",
                            "items": [
                                {
                                    "type": "terminal",
                                    "orthography": "打电话给",
                                }
                            ]
                        },
                        {
                            "type": "tag",
                            "name": "name",
                            "items": [
                                {
                                    "type": "terminal",
                                    "orthography": "赵麻子",
                                }
                            ]
                        },
                        {
                            "type": "terminal",
                            "orthography": "的",
                        },
                        {
                            "type": "tag",
                            "name": "PHONELOCATION_TAG",
                            "items": [
                                {
```

```
            "type": "terminal",
            "orthography": "家庭号码",
            "ID": 1
          }
        ]
      }
    ]
  }
        ]
      }
    ]
  }
      ]
    }
  ]
}
```

The added type in the above returned result indicates a type of information in the field. For example, "type": "tag" indicates that the field includes tag information, and "type": "terminal" indicates that the field includes terminal (i.e., slot) information. In addition to the tag and the id, other redundant information may be added as required. The correspondence relationship between the tag and an instruction included in the slot corresponding to the tag is embodied through an inclusion manner with { }. It is certain that other defined manners may be used to embody the correspondence relationship.

Taking "呼叫张三的移动号码" ("phoning the mobile number of Zhang San") as an example, a result in the following format may be returned.

```
{
  "startRule": "main_scene",
  "items": [
    {
      "type": "tag",
      "name": "CALL_TAG",
      "items": [
        {
          "type": "tag",
          "name": "CALLNAME_TAG",
          "items": [
            {
              "type": "tag",
              "name": "CALLCMD_TAG",
              "items": [
                {
                  "type": "terminal",
                  "orthography": "呼叫"
                }
              ]
            },
            {
              "type": "tag",
              "name": "name",
              "items": [
                {
                  "type": "terminal",
                  "orthography": "张三"
                }
              ]
            },
            {
              "type": "terminal",
              "orthography": "的"
            },
            {
              "type": "tag",
              "name": "PHONELOCATION_TAG",
              "items": [
                {
                  "type": "terminal",
                  "orthography": "移动号码",
                  "ID": 2
                }
              ]
```

In addition, in other embodiments, it is also possible that only the tag, the ID and some of the fields are returned; or only the tag is returned; or only the tag and some of the fields are returned.

At step 304, a control intention of the user is determined according to the returned result.

The tag has a correspondence relationship with the intention, and the corresponding intention may be obtained according to the tag. For example, it can be determined, from tag: CALL_TAG, that the intention of the user is calling, i.e., domain: call. It can be determined, from tag: CALLNAME_TAG, that the type of the calling made by the user is phoning a contact person, rather than phoning the yellow page or directly phoning a number, i.e., intent: callName. It can be determined, from tag: PHONETYPE_TAG, that the user also assigns a certain number type of the contact person. It can be determined, based on an instruction of "赵麻子" ("Zhao Mazi") corresponding to PHONETYPE_TAG, that the user assigns a certain number type of Zhao Mazi. It can be determined, from id:1, that the number type assigned by the user is family landline.

At step 305, a control action is executed according to the control intention.

In the present embodiment, it has been determined that the control intention is calling the family landline of Zhao Mazi. At this time, a dialing module is invoked, and dialing is performed after the family landline of Zhao Mazi is found in the address book.

In the present embodiment, extraction and parsing of the result of voice recognition does not rely on specific text character rings, but the extraction may be extracted based on the redundant information. On one hand, when addition, deletion, modification are made to an instruction set of the same category, only the syntax document needs to be modified, and a control logic may not be changed at all, so that the syntax is completely separated with other control logics. For example, if "landline" needs to be added to the above number type of family number, it is only needed to add "landline" to the BNF syntax document with id thereof being set as 1, and no other change needs to be made. On the other hand, for voice recognition of multiple languages, for example in the English Language environment, the user also uses the function of dialing a contact number. Tags are not changed here, and adjustment may be made to a rule corresponding to <CallName>. This is determined by syntax features of different languages. However, because of the existence of tag: CALLNAME_TAG, no matter what kind of adjustment is made to the rule thereof, the semantic result of phoning someone may be obtained based on this tag. Similarly, for a specific instruction, the instruction corresponding to <CallCmd> may be modified into "Call", "Dial", "Place a call to" and so on, but it can still be known, from the tag: CALLCMD_TAG, that the instruction corresponds to the action of dialing. Similarly, the instruction corresponding to <PhoneType> may be modified into "Home", "Home phone number", "Landline" and so on. However, since neither of the tag and the id thereof is changed, the intention of the user obtained, when the semantics is extracted, is phoning a phone number of a contact person, and a direct control may be made accordingly. In this way, the previous process of matching specific identification text is changed. In related technologies, when foregoing changes are made, the logic control of the program is no longer effective, and a lot of matching and modification are required to enable the logic control to function. However, quick modification and support may be realized by the solution provided in the present embodiment.

It should be noted that a voice control is taken as an example in the present embodiment to illustrate the present application. When the operation information is text information, the present application is also applicable. When the operation information input by the user is text information, only replacing the voice information in the above embodiment with the text information needs to be done, and a control may be performed after the control intention of the text information is identified. There is no voice-to-text process relative to the voice control.

Embodiment 3

Figure 5:
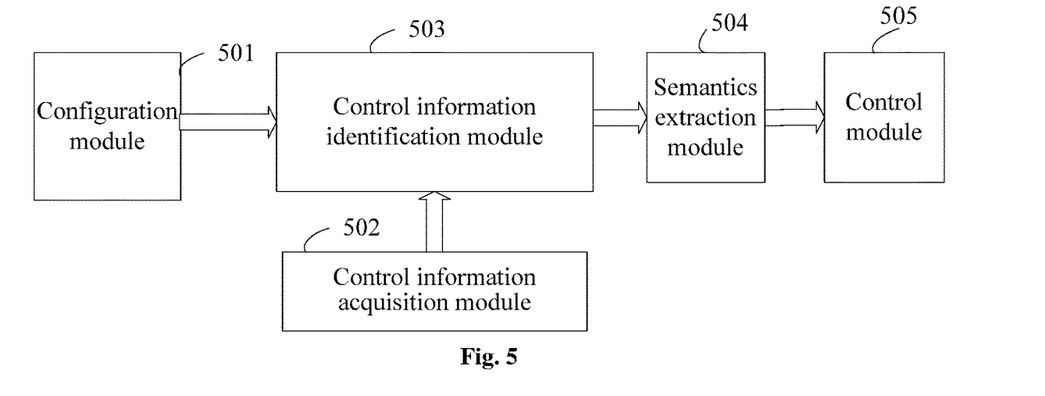
FIG. 5 is a block diagram of a smart control implementation device provided in an embodiment of the present application.

The present embodiment provides a smart control implementation device, as shown in FIG. 5, which includes a configuration module 501, a control information acquisition module 502, a control information identification module 503, and a semantics extraction module 504.

The configuration module 501 is configured to configure pre-determined syntax information which is including sentence pattern rules, an instruction set, and semantic tags corresponding to the sentence pattern rules, wherein the semantic tags indicating semantics of an instruction meeting a corresponding sentence pattern rule thereof; and besides, the configuration module 501 may further be configured to allocate linguistic data resources according to the system language and so on. Different BNF syntax documents and linguistic data resources may be loaded according to different language types, so that voice recognition may be supported in different language environments.

The control information acquisition module 502 is configured to acquire control information and send the control information to the control information identification module.

The control information acquisition module 502 may be an audio module. Voice of the user is input into the audio module for recording and transferring so as to obtain corresponding audio sampled signals. Authentic voice of the user is input, and audio data signals with a certain sampling rate are output.

The control information identification module 503 is configured to identify the control information on the basis of the pre-determined syntax information configured by the configuration module 501, acquire semantic tags corresponding to a matched sentence pattern rule of the control information, and send the semantic tags to the semantics extraction module 504.

When the control information is voice information, the control information identification module 503 identifies audio signals and returns an identification result of the text. Specific ways to identify voice to text are not described in detail herein, and reference can be made to related technologies.

The semantics extraction module 504 is configured to determine a control intention according to the semantic tags corresponding to the matched sentence pattern rule of the control information.

In an embodiment, the smart control implementation device further includes a control module 505. The semantics extraction module 504 is further configured to send the control intention to the control module 505. The control module 505 is configured to execute a control action according to the control intention. For example, if the user wants to call the family number of the contact person, the control module invokes a dialing module to directly find the number of the corresponding contact person and make the dialing; and if the user intends to play a song, the control module invokes a music-playing module to directly play assigned music.

Figure 6:
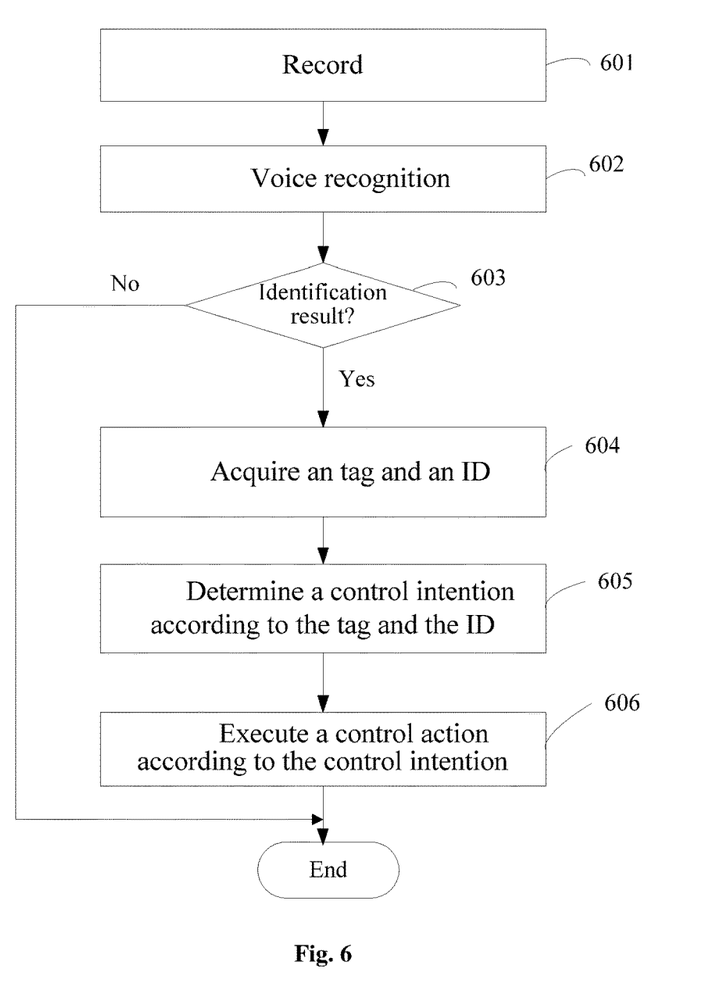
FIG. 6 is a flowchart of implementing a smart control based on the smart control implementation device provided in an embodiment of the present application.

As shown in FIG. 6, a smart control implementation method implemented by means of the above smart control implementation device includes step 601 to step 606.

At step 601, when the device is ready and the above BNF syntax document has been loaded, the control information acquisition module 502 of the device records voice input of the user.

At step 602, audio signals obtained by sampling are sent to the control information identification module 503 for identification.

At step 603, whether there is an identification result is determined. If there is no identification result, i.e., no matching identification result is output, the process ends, and the process may be restarted to start the voice procedure; and if an identification result (in the form of text) is output, step 604 is performed.

At step 604, the semantics extraction module 504 extracts tags and ids together with field information corresponding to the tags and ids according to the identification result output by the control information identification module.

At step 605, the semantics extraction module 504 determines a control intention of the user according to the tags and ids and outputs the control intention to the control module 505.

At step 606, the control module 505 executes a control action according to the control intention. For example, the control module 505 directly invokes a corresponding application module to automatically complete controls such as dialing or playing music, and the process ends.

In related technologies, the control intention is analyzed and obtained by making matching and comparison of plain text in the identification result, so that extraction of semantics is strongly related to text instructions. However, the text instructions are changed constantly because of different languages and addition, deletion and modification and so on. As a result, extraction of the semantics has no rule to follow, and any modification to the BNF syntax document may lead to change of the semantics extraction module 504. However, with the method of the present application, the semantics extraction module 504 may remain unchanged, and configurability and extendibility can be realized only by modifying peripheral configuration data and resource documents (the BNF syntax document is also a resource in a broader sense, and exists in the form of document).

Figure 7:
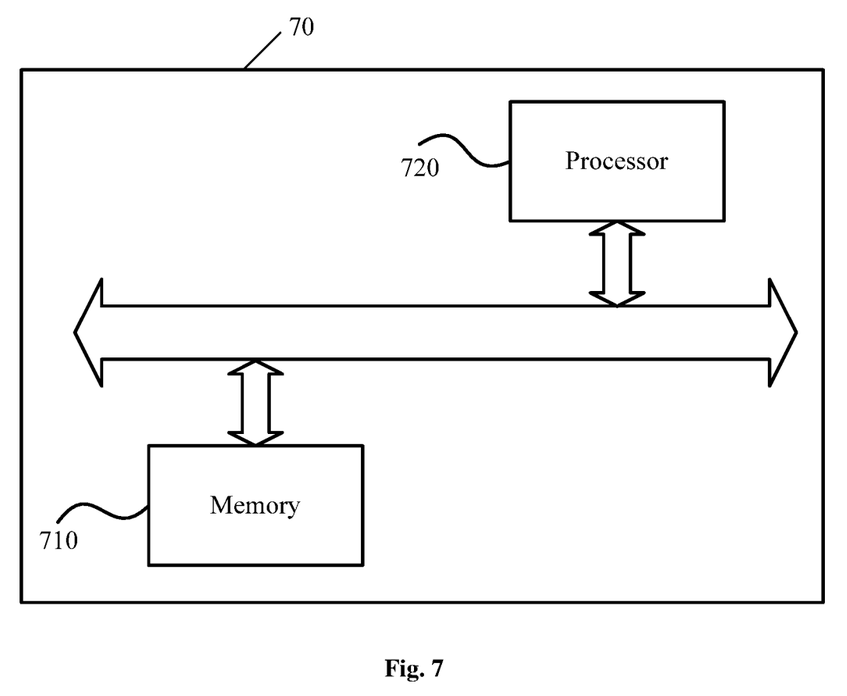
FIG. 7 is a block diagram of a smart control implementation device provided in another embodiment of the present application.

As shown in FIG. 7, an embodiment of the present application provides a smart control implementation device 70, which includes a memory 710 and a processor 720. The memory 710 stores a program which, when read and executed by the processor 720, carries out the smart control implementation method according to any of the foregoing embodiments.

An embodiment of the present application provides a computer readable storage medium, which stores at least one program. The at least one program is executable by at least one processor so as to implement the smart control implementation method according to any of the foregoing embodiments.

The computer readable storage medium includes various mediums that can store program codes, such as a USB disk, a read-only memory (ROM), a random access memory (RAM), a removable hard disk, a magnetic disk, an optical disk and so on.

What is claimed is:

1. A smart control implementation method, comprising:
configuring pre-determined syntax information, which is comprising sentence pattern rules, an instruction set, and semantic tags corresponding to the sentence pattern rules, wherein the semantic tags indicating semantics of an instruction meeting a corresponding sentence pattern rule thereof;
acquiring control information;
identifying the control information on the basis of the pre-determined syntax information, and acquiring semantic tags corresponding to a matched sentence pattern rule of the control information; and
determining a control intention according to the semantic tags corresponding to the matched sentence pattern rule of the control information.

2. The smart control implementation method according to claim 1, wherein the control information comprises at least one of the following: voice information and text information.

3. The smart control implementation method according to claim 1, wherein acquiring semantic tags corresponding to a matched sentence pattern rule of the control information comprises:
acquiring semantic tags corresponding to a matched sentence pattern rule of the control information, and acquiring a matched instruction of the control information, wherein the matched instruction having a correspondence relationship with the semantic tags corresponding to the matched sentence pattern rule; and
wherein determining a control intention according to the semantic tags corresponding to the matched sentence pattern rule of the control information comprises:
determining a control intention according to the semantic tags corresponding to the matched sentence pattern rule of the control information and the matched instruction of the control information.

4. The smart control implementation method according to claim 1, wherein the method further comprises: classifying instructions in an instruction set by classifying instructions with same semantics into one category, and uniformly allocating one piece of identification information, which indicates a category of the instructions, for instructions of the same category;
wherein acquiring semantic tags corresponding to a matched sentence pattern rule of the control information comprises:
acquiring semantic tags corresponding to a matched sentence pattern rule of the control information and acquiring a matched instruction of the control information or
acquiring semantic tags corresponding to a matched sentence pattern rule of the control information and acquiring a matched instruction of the control information and acquiring identification information of the matched instruction of the control information; and
wherein determining a control intention according to the semantic tags corresponding to the matched sentence pattern rule of the control information comprises:

determining a control intention according to the semantic tags corresponding to the matched sentence pattern rule of the control information and the identification information of the matched instruction; or
determining a control intention according to the semantic tags corresponding to the matched sentence pattern rule of the control information, the matched instruction, and the identification information of the matched instruction.

5. The smart control implementation method according to claim 1, wherein the pre-determined syntax information comprises a main rule, a sub-rule and a slot, wherein the main rule comprising at least one sub-rule, a sub-rule comprising at least one sub-rule or comprising at least one slot, each slot including one instruction set, wherein at least one of the main rule, the sub-rule and the slot having a corresponding semantic tag.

6. The smart control implementation method according to claim 1, wherein the method further comprises executing a control action according to the control intention.

7. A non-transitory computer readable storage medium, wherein the computer readable storage medium stores at least one program that is executable by at least one processor so as to implement the smart control implementation method according to claim 1.

8. A smart control implementation device, comprising a processor and a memory storing a program which, when executed by the processor, causes the processor to implement steps of:
configuring pre-determined syntax information, which is comprising sentence pattern rules, an instruction set, and semantic tags corresponding to the sentence pattern rules, wherein the semantic tags indicating semantics of an instruction meeting a corresponding sentence pattern rule thereof;
acquiring control information;
identifying the control information on the basis of the pre-determined syntax information, and acquiring semantic tags corresponding to a matched sentence pattern rule of the control information; and
determining a control intention according to the semantic tags corresponding to the matched sentence pattern rule of the control information.

9. The smart control implementation device according to claim 8, wherein the control information comprises at least one of the following: voice information and text information.

10. The smart control implementation device according to claim 8, wherein the program which, when executed by the processor, causes the processor to implement steps of:
classifying instructions in the instruction set by classifying instructions with same semantics into one category, and uniformly allocating one piece of identification information, which indicates a category of the instructions, for instructions of the same category;
wherein the step of acquiring semantic tags corresponding to a matched sentence pattern rule of the control information comprises:
acquiring semantic tags corresponding to a matched sentence pattern rule of the control information, and acquiring identification information of a matched instruction of the control information; and
wherein the step of determining a control intention according to the semantic tags corresponding to the matched sentence pattern rule of the control information comprises:

determining a control intention according to the semantic tags corresponding to the matched sentence pattern rule of the control information and the identification information of the matched instruction.

11. The smart control implementation device according to claim 8,
wherein the step of acquiring semantic tags corresponding to a matched sentence pattern rule of the control information comprises: acquiring semantic tags corresponding to a matched sentence pattern rule of the control information, and acquiring a matched instruction of the control information, wherein the matched instruction having a correspondence relationship with the semantic tags corresponding to the matched sentence pattern rule; and
wherein the step of determining a control intention according to the semantic tags corresponding to the matched sentence pattern rule of the control information comprises: determining a control intention according to the semantic tags corresponding to the matched sentence pattern rule of the control information and the matched instruction of the control information.

12. The smart control implementation device according to claim 8, wherein the pre-determined syntax information comprises a main rule, a sub-rule and a slot, wherein the main rule comprising at least one sub-rule, a sub-rule comprising at least one sub-rule or comprising at least one slot, each slot including one instruction set, wherein at least one of the main rule, the sub-rule and the slot having a corresponding semantic tag.

13. The smart control implementation device according to claim 8, wherein the program which, when executed by the processor, further causes the processor to implement a step of:
executing a control action according to the control intention.

* * * * *